Oct. 6, 1936.                R. DUNCAN ET AL                    2,056,841
                PERFORATED RECORD CONTROLLED TABULATING MACHINE
                    Filed Nov. 12, 1935            8 Sheets-Sheet 1

Inventors
ROBERT DUNCAN
LESTER F. WILKINSON

By J. B. Mothershead
                Attorney

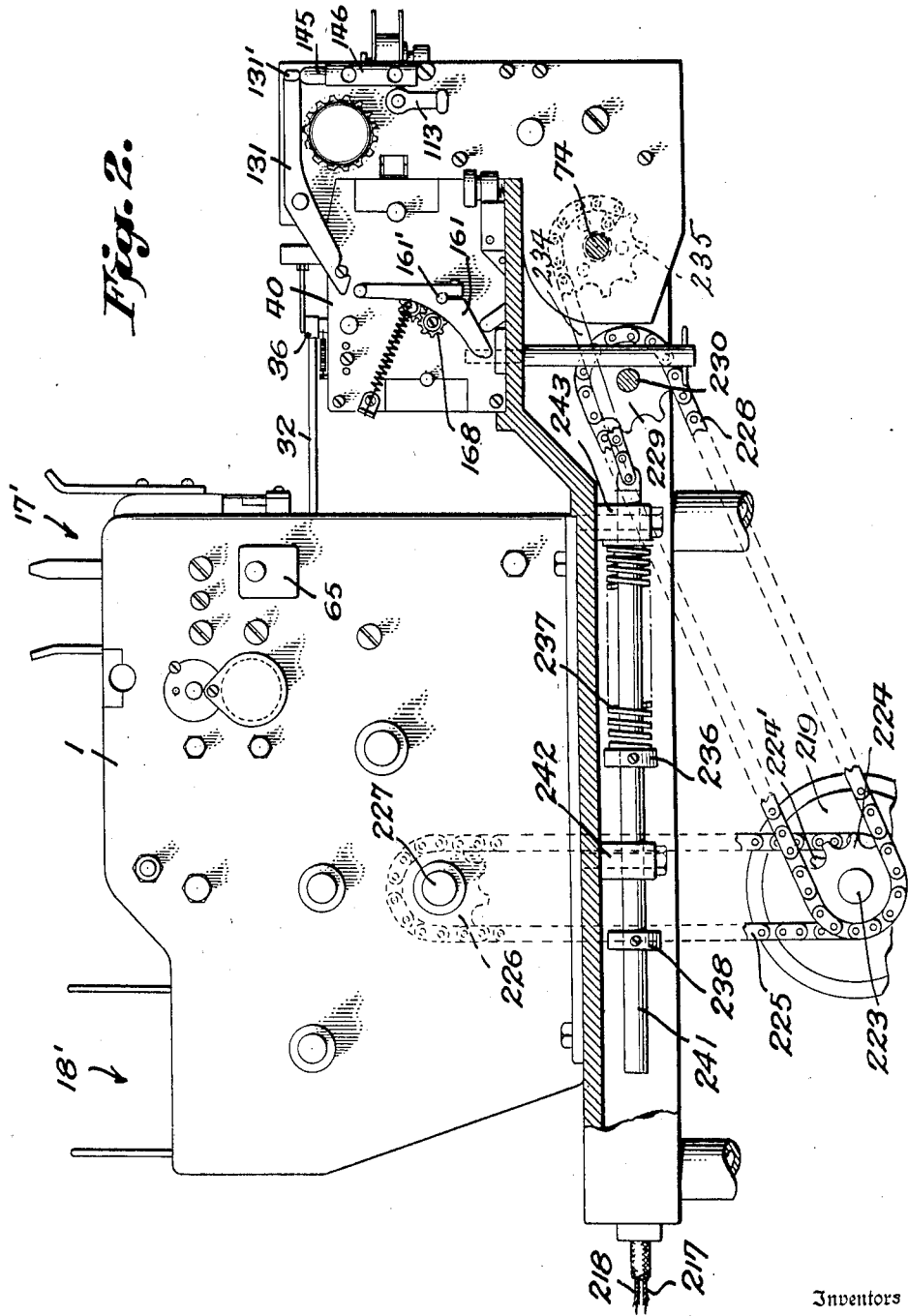

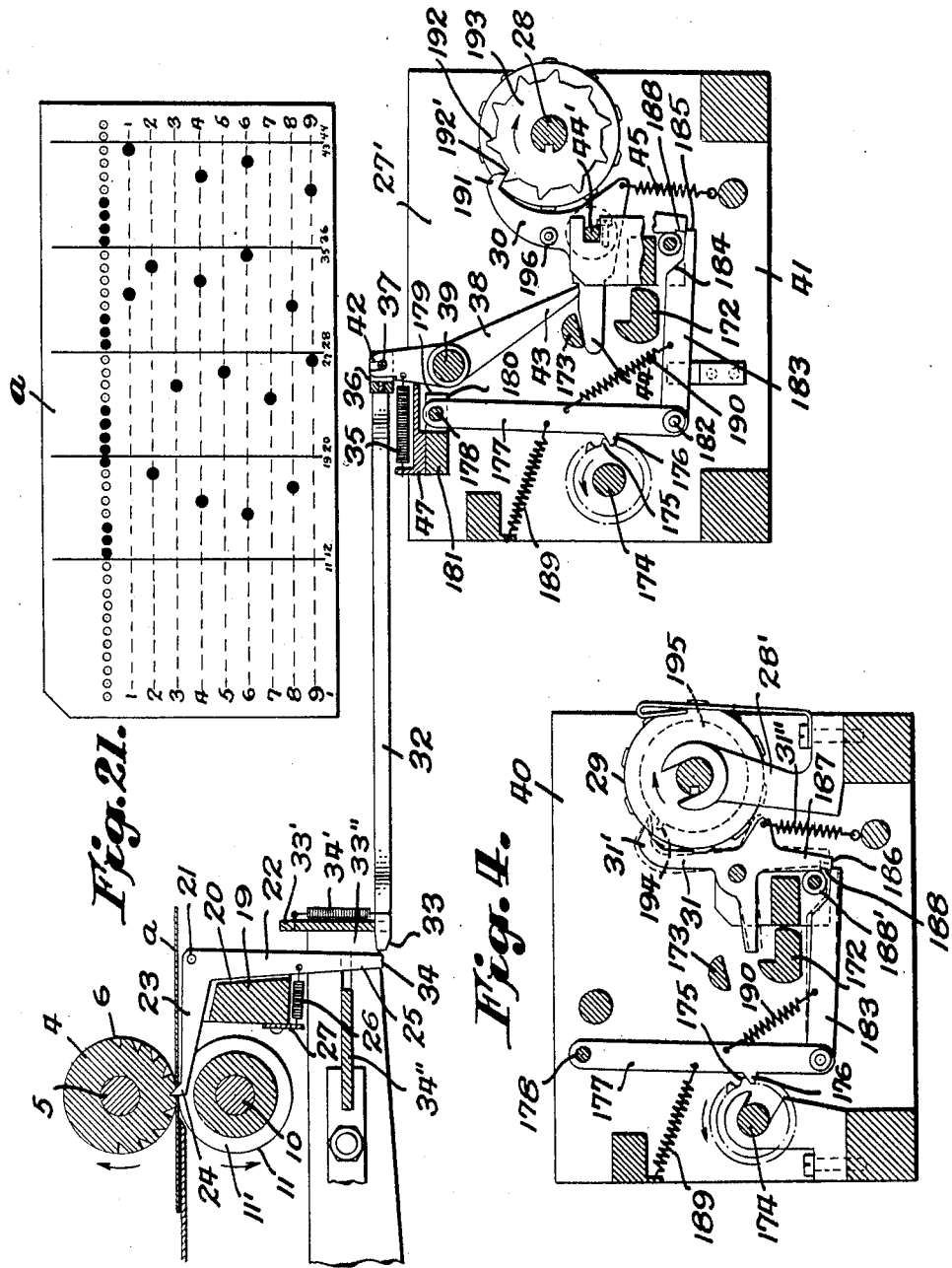

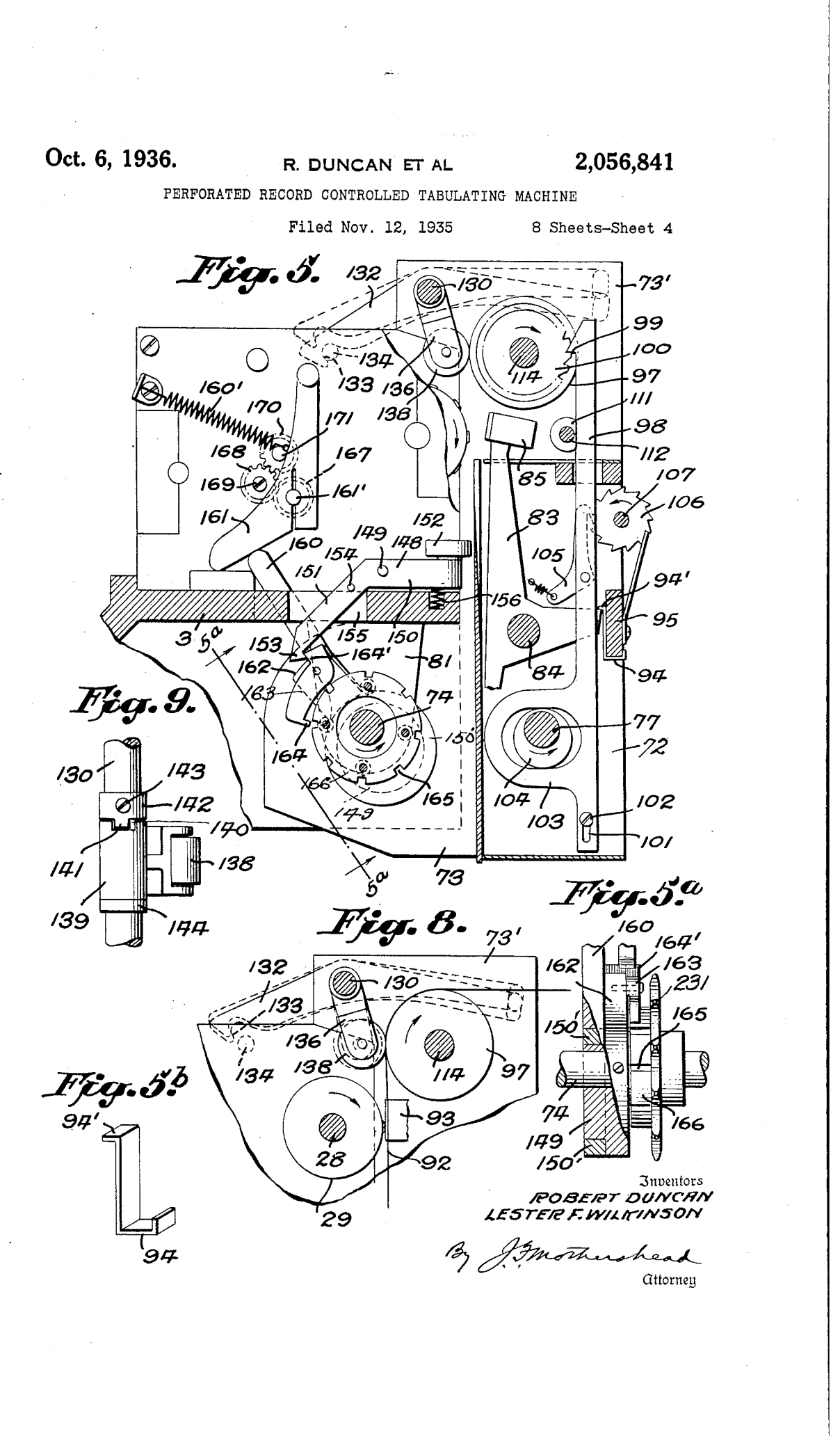

Oct. 6, 1936.  R. DUNCAN ET AL  2,056,841
PERFORATED RECORD CONTROLLED TABULATING MACHINE
Filed Nov. 12, 1935  8 Sheets-Sheet 4

Inventors
ROBERT DUNCAN
LESTER F. WILKINSON
By J. F. Mothershead
Attorney

Oct. 6, 1936.   R. DUNCAN ET AL   2,056,841
PERFORATED RECORD CONTROLLED TABULATING MACHINE
Filed Nov. 12, 1935   8 Sheets-Sheet 5

Inventors
ROBERT DUNCAN
LESTER F. WILKINSON
By J. F. Motherhead
Attorney

Oct. 6, 1936.  R. DUNCAN ET AL  2,056,841
PERFORATED RECORD CONTROLLED TABULATING MACHINE
Filed Nov. 12, 1935  8 Sheets-Sheet 6
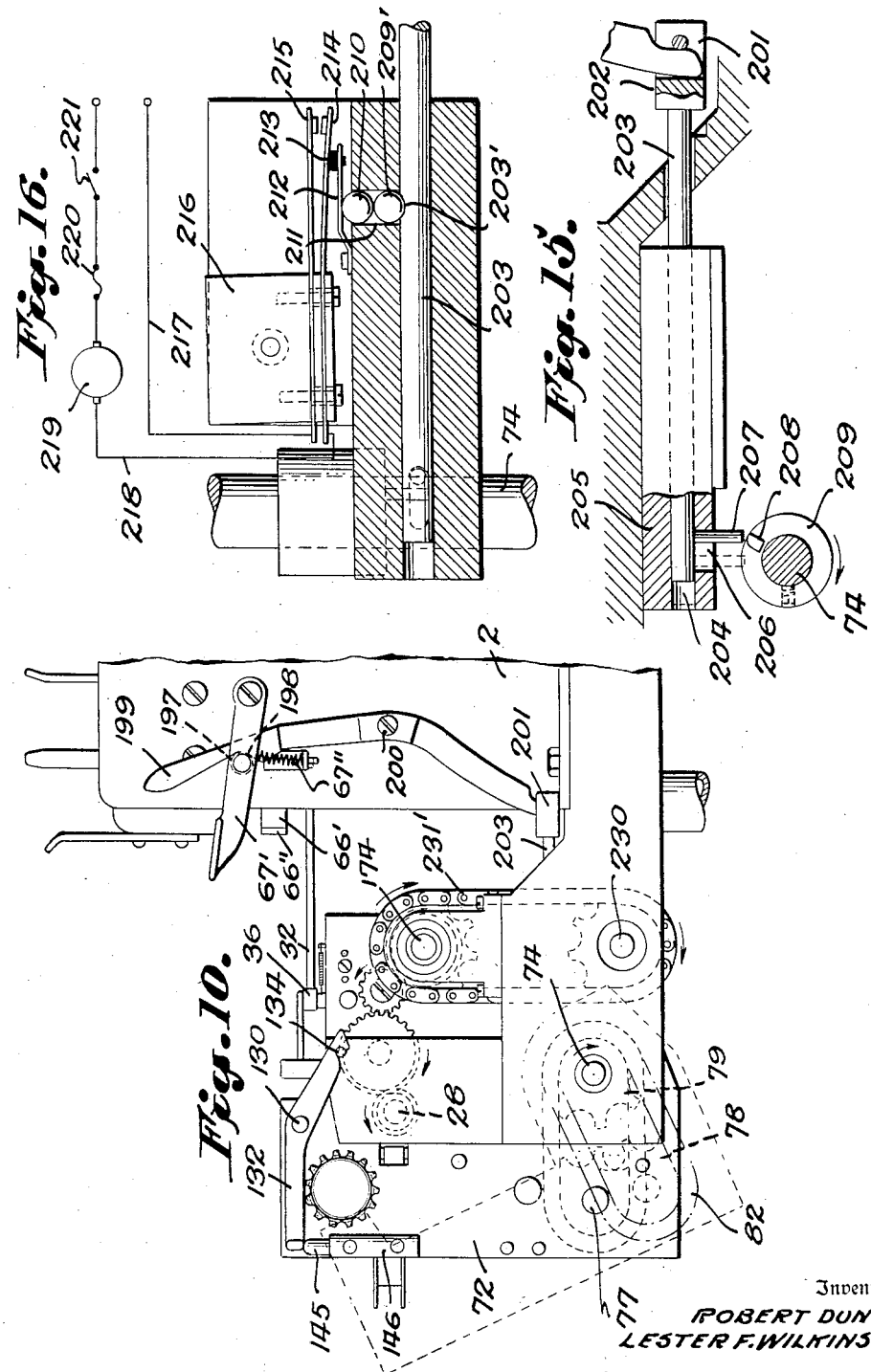
Inventors
ROBERT DUNCAN
LESTER F. WILKINSON
By J. F. Mothershead
Attorney

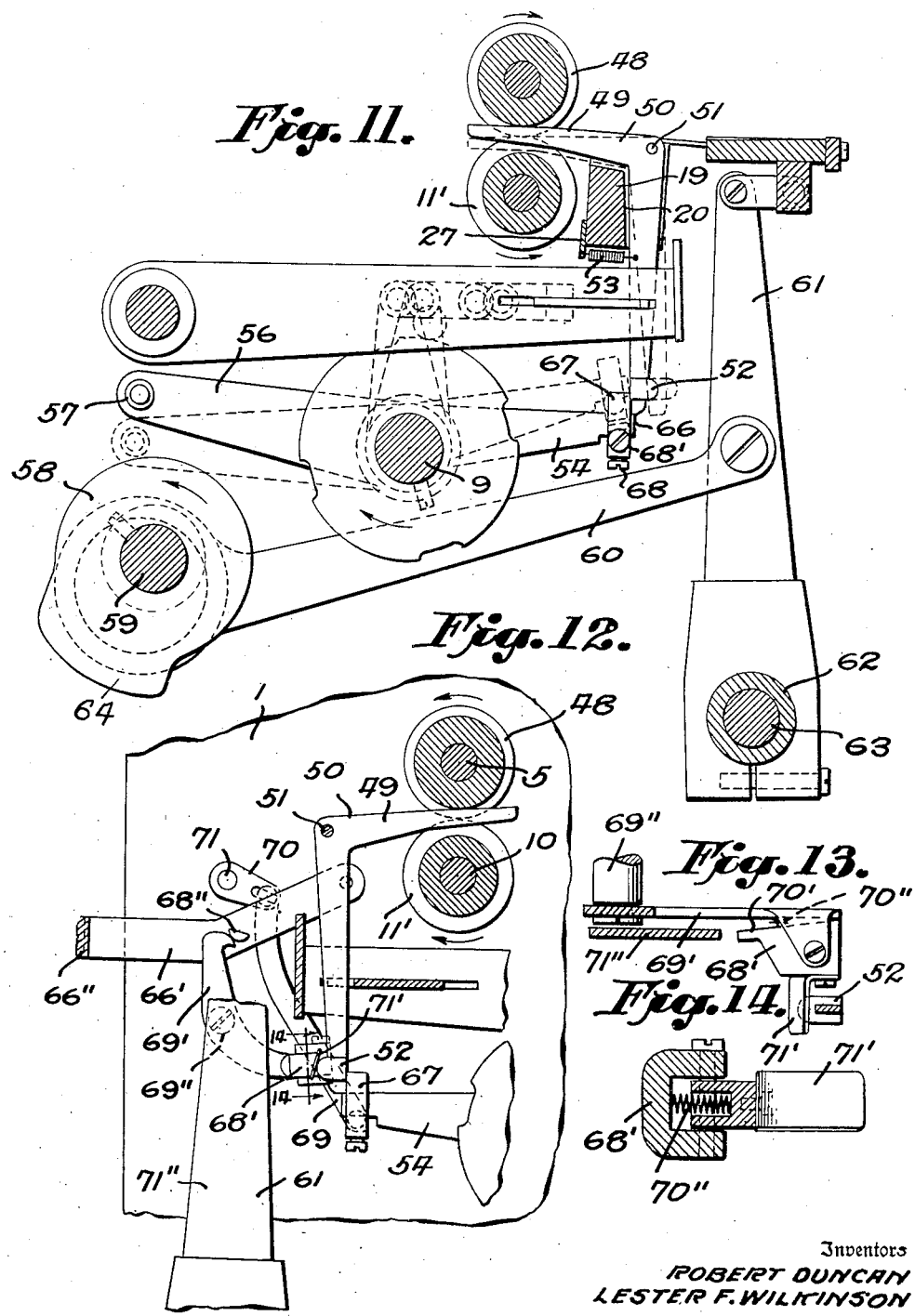

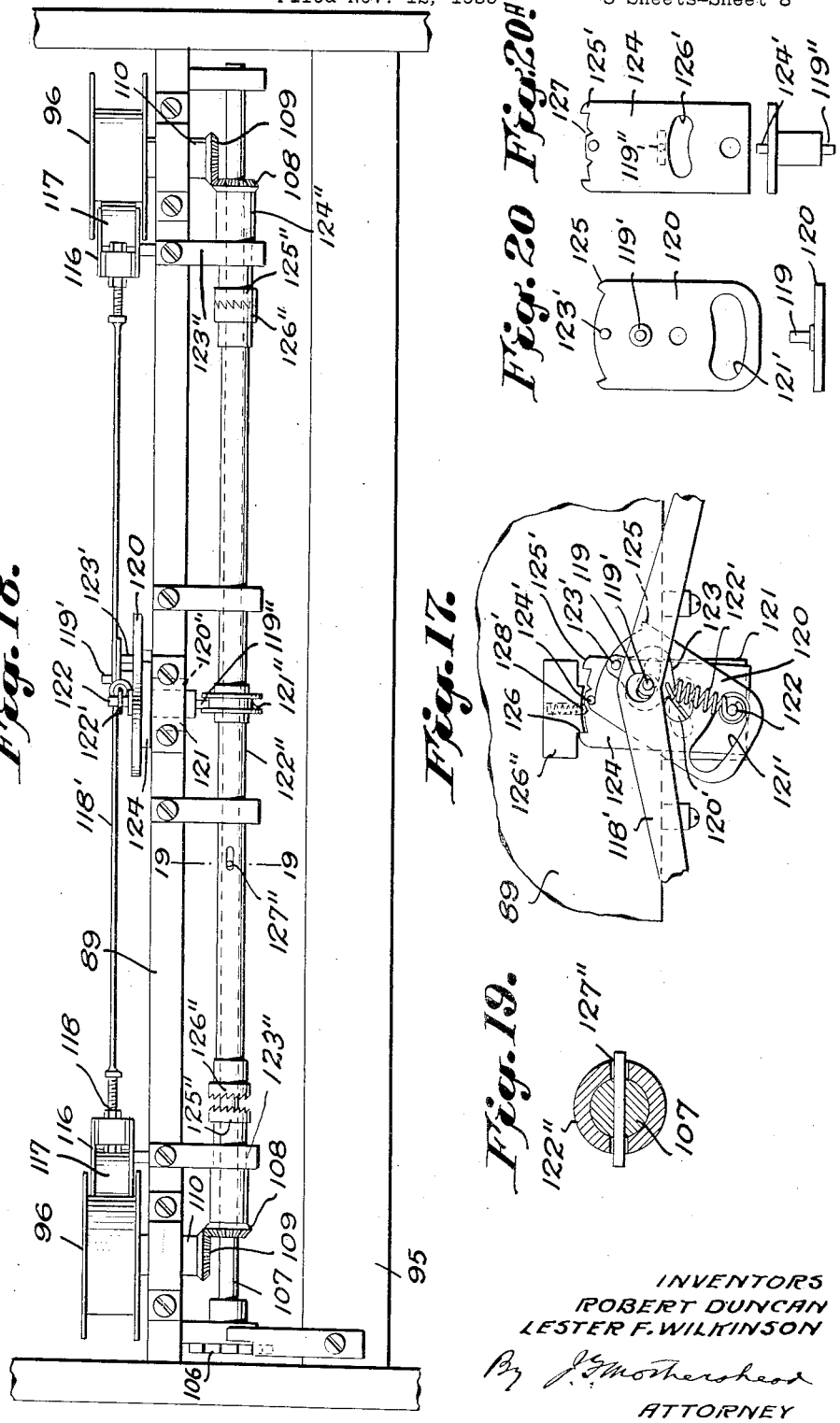

Patented Oct. 6, 1936

2,056,841

UNITED STATES PATENT OFFICE 2,056,841

PERFORATED RECORD CONTROLLED TABULATING MACHINE

Robert Duncan, Washington, D. C., and Lester F. Wilkinson, Garrett Park, Md., assignors to the Government of the United States, represented by the Secretary of Commerce Application November 12, 1935, Serial No. 49,370

2 Claims. (Cl. 235—144)

(Granted under the act of March 3, 1883, as amended April 30, 1928; 370 O. G. 757)

The invention described herein may be manufactured and used by or for the Government of the United States for governmental purposes without the payment to us of any royalty thereon.

This invention relates to improvements in perforated record-controlled tabulating machines.

The object of the invention is to provide a simple, durable and efficient mechanism for printing the totals of the tabulations in line form divided into columns, properly separated upon a removable record sheet and for automatically and quickly resetting the numeral wheels, after each print.

The invention about to be described has a special relation to the disclosure in the application Serial No. 49,408, filed November 12, 1935, by Eugene M. La Boiteaux, which eventuated in Patent No. 2,035,752, dated March 31, 1936 for Improvements in tabulating machines,—and in order that our invention may be more readily understood, we have duplicated much of the illustrations of the mechanism of the La Boiteaux invention, but make no claims thereto or to parts thereof, except where certain elements of said invention are necessarily and legitimately involved in combinations other than those devised by La Boiteaux.

In the drawings illustrating the invention:

Figure 1 is a top plan view of the tabulating machine to which our invention is applicable, showing the operative connections between the analyzing unit and the tabulating and printing units, arranged in groups of eight, there being shown a record card in place in a machine, upon which such grouping of operative connections would function to tabulate from the data represented by the perforations of the four columns to the left, in the position in which the card passes through the machine.

Figure 2 is a side view, partly in elevation and partly in section, looking at the left-hand side of the machine.

Figure 3 is a view taken about on line 3—3 of Figure 1, and illustrates the analyzing and the numeral wheel mechanisms and connections between them.

Figure 4 is a view taken about on the line 4—4 of Figure 1, illustrating, partly in section and partly in elevation, details of the numeral wheel mechanism.

Figure 5 is a side view of the front portion of the machine showing some of the parts in elevation and others in section, the side plates being removed.

Figure 5a is a detailed side view and partial section of a cam and clutch disk mechanism illustrated in Figure 5, looking in the direction of the arrows 5a.

Figure 5b is a perspective view of a device for rendering the printing hammers inoperative.

Figure 8 is a detailed view of a portion of the latch and paper-release mechanism.

Figure 9 is a detailed view of the paper-tension roll and shaft.

Figure 10 is a side elevation of the front portion of the machine looking at the right side thereof.

Figure 11 is a detail view of the "no-card" control mechanism, containing elements which function in connection with the card register or counter.

Figure 12 is a view taken on line 12—12 of Figure 1 looking from the right side of the machine.

Figure 13 is a plan and partial section of a portion of the means for holding the counter or register-operating arm in inoperative position.

Figure 14 is a section taken on the line 14—14 of Figure 12.

Figure 15 is a side view, partly in elevation and partly in section, of parts of the means for starting and stopping the motor.

Figure 16 is a bottom plan, partially in section, of the same mechanism.

Figure 17 is a plan view of a portion of the ribbon shifting mechanism, and

Figure 18 is an elevation of a portion of the same mechanism showing the connection between one of the pivoted plates and the slidable clutch sleeve.

Figure 19 is a cross section taken on line 19—19 of Figure 18.

Figure 20 is a plan and edge view of the top plate shown in Figure 17.

Figure 20A is a similar view of the bottom pivoted plate shown in Figure 17.

Figure 21 is a plan view of a card or perforated record whose information, as indicated by the perforations therein, would be adapted to be tabulated when the push rods are in the particular group arrangement shown in Figure 1.

Figure 1:
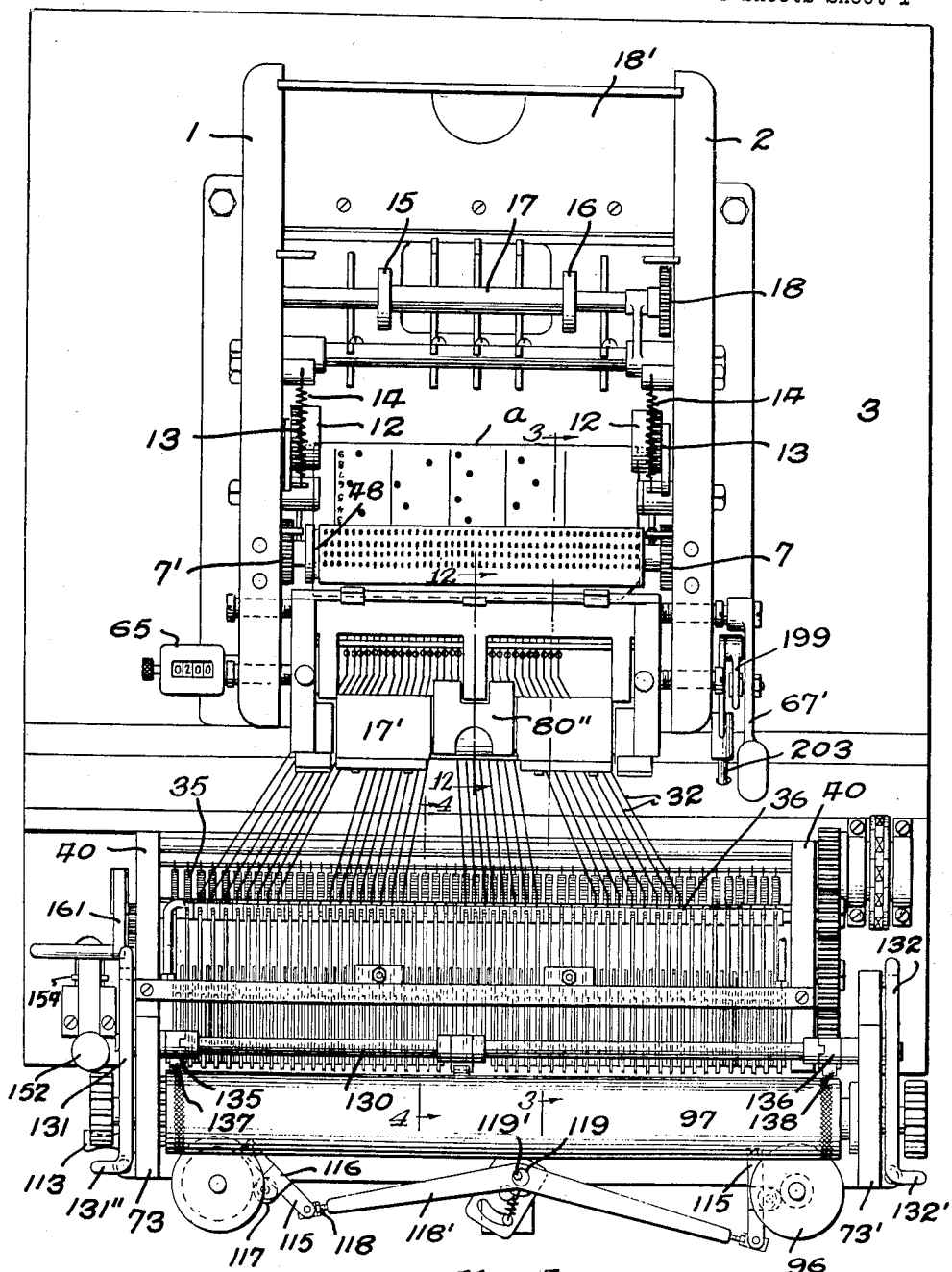

Referring to the drawings, the numerals 1 and 2 designate the side plates of the machine and 3 the base thereof. In the plates are journaled various shafts,—some extending entirely across the machine, and others stub,—some continuously revolving,—some intermittently rotating, and others having merely an oscillatory movement. The shafts carry gears, and sprockets, cams and eccentrics, all arranged and timed for coordinative action.

Referring particularly to Figures 1 and 3, the numeral 4 designates the power-transmitting feed roll of the analyzing unit or mechanism of the machine. It is mounted on the transverse shaft 5 having bearings in the side plates 1 and 2 and has nine cam-sided recesses, 6 arranged in longitudinal rows and circumferential columns, as shown best in Figure 1. The ends of the shaft carry gears 7 and 7', the gear 7 meshing with an idler gear below it, which in turn meshes with a power gear on the shaft 9 mounted in the side plates 1 and 2, the power gear serving to transmit rotation and power to the analyzing roll 4 through the intervening gear. The gear 7' of the roll 4 meshes with a similar gear directly below it, the latter gear being on the shaft 10 of a roll 11 directly below the roll 4 and provided with an annular groove 11' there-around for the reception of the heads of the analyzing levers. The shaft 10 of the lower roll is not mounted in the side plates, but in the ends of oppositely-disposed links pivoted to the inner sides of the side plates, and this shaft has but one gear and that in mesh with the gear 7' of the analyzing roll 4. The links in which the shaft 10 have bearings are suspended by stretched springs so that the gear thereon will mesh yieldingly with the gear 7', and the rolls are kept in complete longitudinal contact with each other, except when a card is passing between them, and the card or perforated record which is designated by a, Figure 3, is so thin that it has no appreciable effect upon the relation between the gears.

Next to the analyzing roll and its companion, which are feed rolls and more, are feed rollers 12, adjacent which, or a part of which, are gears 13. These upper rollers and gears are mounted upon stub shafts in oppositely-disposed hangers pivoted to the inner sides of the side plates, the hangers being urged downwardly by springs 14 so as to keep the gears yieldingly in mesh with the gears on the shafts of similar rollers located directly below the rollers 12.

Other feed rollers 15 and 16 are provided on a transverse shaft 17 carrying a gear 18 which meshes with other gears appropriately arranged and driven, and it is enough to say that these feed rolls and rollers are duly arranged with relation to a feed hopper 17' in a stacker hopper 18'. None of the elements, however, that have been described, form any part of this invention, in themselves or specifically.

In front of the analyzing roll 4 and its grooved companion roll 11, is a transverse pivot bar 19 extending entirely across the machine and suitably secured to the side plates. This bar is formed with numerous recesses 20 in which are mounted pivotally, on transverse pivot pin 21, numerous analyzing levers 22, one lever in each recess, and in which the levers are free to rock and are guided and held in true vertical alignment. The horizontal arm 23 of the lever is formed with a head of the shape of the cam-sided recesses 6 in the analyzing roll 4, into which recesses the heads are arranged to extend whenever a hole in a card is available, and be forcefully expelled therefrom upon the rotation of the roll in the direction of the arrow, Figure 3. The other arm 25 of the lever extends below the pivot bar 19 and to it is attached the spring 26 with its other end fastened to a transverse plate 27 secured to the bar, the spring obviously urging the head 24 of the lever always upward so that it will quickly enter one or another of the recesses 6 in the roll 4 when available through a perforation; otherwise the spring will hold the head firmly against the card while running between the rolls at points where there are no perforations in the cards. The numeral 27 designates what may generally be regarded as the tabulating unit, which is located at the front of the machine. It includes a continuously revolving shaft 28 mounted in open end bearings in the standards 28' and upon which shaft are frictionally mounted numerous numeral wheels 29, and for each wheels there are two anchors, one an "active" anchor 30 which operates throughout the tabulating operation to permit the wheels to rotate with the shaft or not, accordingly as the anchor is controlled by the analyzing means; and the other a "transfer" anchor 31 actuated when a particular wheel has counted up to its capacity to transfer the excess to the adjoining wheel, the like of which is found and fully described in the La Boiteaux application above referred to. But the specific anchor controlling connections between the analyzing unit and the tabulating unit are, so far as we are aware, new with us. An element in these connections is a push bar 32, with its rear end 33 positioned so it will be engaged and moved longitudinally in one direction (forward) by the lower end 34 of the analyzing lever, accordingly as the head 24 of the lever is expelled from one or another of the recesses in the analyzing roll, and in the other direction (rearward) the rod is normally urged by a spring 35. The forward end of the push rod carries a bifurcated adjustable head 36, with a pin 37 spanning the recess in the head. The numeral 38 designates a rockable anchor-control arm on a shaft 39 mounted in suitable bearings in the plates 40 and 41, and this shaft forms a pivot for all of the numerous control arms. The upper end of the control arm is provided with an open end recess 42 for the reception of the pin 37, thus providing a readily removable connection between the push rod and its control arm, which makes feasible the quick and expeditious rearrangement of the push rods according to the exigencies of tabulation of different card-column arrangement. The lower end 43 is arranged to engage the rearwardly-extending arm 44 of the "active" anchor to rock it on its pivot 44' to disengage it from a tooth on a numeral wheel against the influence of a spring 45 to permit the wheel to revolve with the shaft and count a number (from 1 to 9), according to the digit number of the notch in the analyzing roll from which the head 24 has been expelled, the digit number of the perforations in the card always corresponding with the digit number of the recess in the roll. For instance, the head is, in Figure 3, in the digit recess 5 and when expelled therefrom by the further revolution of the roll, during which time imperforate portions of the card will be passing over the head; the impulse given the push rod by the analyzing lever will rock the control arm and cause it to rock the anchor out of engagement with a tooth of the wheel and hold it out until the wheel moves with the shaft 28 to count 5.

The push rod is normally urged rearward by the spring 35, connected at one end to the control arm and at the other to a flange on a transverse plate 47, secured to the side plates 40 and 41, and the lower end of the control arm is normally in position to rock the anchor away from the wheel.

The analyzing roll has a groove 48 therearound, Figures 1 and 11, which is in vertical alignment with the similar groove 11' in the roll 11, and between the rolls 4 and 11 and within the groove extends the horizontal arm of the no-card lever 50 of which there is but one and which is pivoted at 51 in one of the recesses 20 in the cross bar 19, with its other vertical arm extending downwardly and to which near its end, is provided a lug 52, the purpose of which will be later described.

In Figures 11 and 12 the lever is shown in no-card position, which is its normal position, to which it is constantly urged by the spring 53 which has one end connected to the lever and the other to the plate 27, which plate is also anchored for the various springs that keep the head ends of the analyzing levers raised. The card position of the lever 50 is shown in dotted lines and in which position the end of the vertical arm of the lever is out of the path of movement of an oscillating arm 54 integral with a sleeve loosely mounted on the continuously revolving shaft 9. To this sleeve is also secured another arm 56 carrying at its end a roller 57 that runs on cam 58 keyed to continuously rotating shaft 59 which has certain eccentrics thereon for operating the card feed through appropriate connections, there being a reciprocating arm 60 connected with a suitable eccentric and also with a rockable arm 61 that has a sleeve 62 loose on shaft 63, whose ends are mounted in side plates 1 and 2. The upper end of the arm 61 carries the card feed knives which push the cards between the rolls one after another. When no cards are going through the machine the no-card lever is in the position shown in full lines, Figures 11 and 12, and the lower end of the no-card lever has been brought by its spring in position to engage the end of the arm 54 latching it against oscillation and causing the arm 56 to remain in its highest position with its roller out of reach of the cam head 64 of the cam 58. The oscillating arm 54, cam 58 and arm 56 we utilize to actuate a counter or register 65, Figure 1. When no cards are going through, the oscillating arm 54 is latched, but as soon as a card passes between the rolls 4 and 11, the horizontal arm 49 of the no-card lever will be depressed, rocking the lower end of its vertical arm out of latching contact with the end of arm 54, permitting the arms 54 and 56 to be rocked by the cam 58 as long as there are cards passing through.

On the end of the arm 54 and just far enough thereon to let the latching end 66 protrude a little beyond it, is a bracket 67 securely held to the arm by a screw 68. To the side of this bracket at 68' is pivoted the lower end of the link 69 pivotally connected by a slot and pin connection with a short oscillating link 70 mounted on the shaft 71 of the card counter or register. It has been seen that so long as the no-card lever occupies a position shown in full lines, its normal position, no cards are passing through, and the arms 54 and 56 are still, the roller 57 on the arm 56 being out of the reach of the cam head 64, even though this cam be turning, but as soon as the cards start through, depressing of the arm 49 of the no-card lever will disengage its vertical arm from the end of the arm 54, letting the roller 57 down on the cam 58, which will from that time on rock both arms 54 and 56, until again at appropriate times the arms will be latched; but in the meantime an oscillating movement is imparted to the link 70 through the long link 69, thus operating the register, and obviously only when the cards are passing through the machine.

Pivoted to the side plates are two oppositely-disposed arms 66' connected by a cross piece 66'' and outside of the plate there is secured to the pivot of the arm a lever 67', Figure 10, to which is attached a spring 67'' pushing the lever up and consequently forcing the arm 66' in the same direction. One of the arms 66'—the one adjacent the no-card lever 50—carries a lug 68'' for engagement by the head of a curved arm 69' pivoted on a boss 69'' on the side plate 1. The other end of the arm has pivoted in its bifurcated end a block 68', Figure 13, which has a narrow projection 70' thereon, the block being held normally in the position shown in the figure by a coiled spring 70'', there being secured to the side of the block an inclined plate 71'. There is a continuously oscillating arm 71'', like 61, and on the opposite side of the machine from 61, or on the same side with the oscillating arm 54, and this arm 71'' is arranged to contact with the projection 70' of the block when the vertical arm of the no-card lever is in its no-card position, or that shown in full lines in Figures 11 and 12, and this contact between the arm 71'' and the projection on the block which is carried by the arm 69' is sufficient to disengage its head from the lug 68'' and allow the arms 66' to rise under the influence of the spring 67''. When the lever 67', Figure 10, is pressed down, the arms 66' will be lowered, permitting the head of the curved arm 68' to ride up over the lug 68'' and thereby hold the arms in lowered position. This action lowers the card-lifting plate 80'', Figure 1, to card feeding position and when the motor is started and the first card passes between the rolls 4 and 11, the horizontal arm of the no-card lever 50 will be pressed down by the card, thus moving the vertical arm forward to dotted-line position, Figure 11, which will cause the lug 52 on said arm to engage the inclined plate 71' on the block 69'' rocking the block and forcing the projection 70' over against the side of the curved arm 80' and out of the path of the movement of the oscillating arm 71''. Obviously when the cards are going through and holding the horizontal arm of the no-card lever depressed, the vertical arm of said lever will be out of engagement with the end of the oscillating arm 54, permitting it to oscillate and thereby through the arm 69 and link 70, operate the card register as long as the horizontal arm of the no-card lever remains depressed.

*Printing mechanism*

The numeral 72 designates a swinging housing for the printing mechanism and the ribbon and paper feed mechanisms. It is provided with two oppositely-disposed plates 73 at its forward side edges through which the shaft 74 extends and upon which the housing and its contained parts pivot, so that the housing may be swung to and from the main body of the machine, there being means to be described for latching the housing to the machine body.

A cam 75 which extends practically for the entire width of the machine is provided with a sharp drop 76, the cam being fast to a shaft 77. Mounted on the right-hand end of this shaft is a sprocket 78, Figure 10, opposite a sprocket 79 fast on a shaft 74, supported in a hanger 81 secured to the under side of the base of the machine, the sprockets being connected for joint movement by a sprocket chain 82, the ratio of the sprockets being such that they will rotate at the same rate. The numeral 83, Figures 5 and 6, designates a printing hammer of which there is one for each numeral wheel on numeral wheel assembly. It is mounted and rocks on a shaft 84 supported in the side plates of the housing, the hammer being provided with a contact head 85, a downwardly-extending cam-engaging arm 86, and a forwardly-extending arm 87, to which one end of a spring 88 is attached, the other end of the spring being attached to the cross piece 89 on the top of which is a plate 90 which extends entirely across the housing and has therein numerous recesses 91 in which the hammers work and by which they are given support against lateral distortion. The cam 75 revolves in the direction of the arrow, and when the end of the hammer arm 86 drops into the deep portion or drop 76 of the cam, the strong spring 88 will force the hammer against the paper 92 to take a print from whatever character that is at the printing point on the numeral wheel, a printing ribbon 93 being interposed between the paper and the character. When the arm 86 leaves the drop 76 and rides on the outer periphery of the cam, the hammer head will be moved from its printing position, as shown in full lines in Figures 5 and 6. The movement of the hammer in printing is very quick due to the steepness of the drop in the cam and the strength of the spring 88. The two dotted lines e (Figure 6) of the drop 76 indicate the position of the cam and the arm 86 just before the parts have been set in motion to print, and immediately thereafter, the space between the dotted lines showing the short distance that the cam travels in order to make a print. It is not desirable at all times to permit all the hammers to operate, as in cases where all of the numeral wheels are not being used, and to hold any one or any number of the hammers out of action, we have contrived the retaining device indicated by the numeral 94 and illustrated in Figure 5b. This device fits on the cross member 95 that spans the space between the sides of the housing and is slidable thereon, being held to the cross member by friction. It is provided at its upper end with a short laterally-extending flange or ledge 94' that is positioned to overhang the front end of the arm 87 of any hammer that is to be rendered inactive, and when not required, it may be slid to one side out of the way of all hammers. The device shown is of a width that adapts it for controlling one hammer, but it will be understood that its width may be varied to control any number of hammers as the necessities may require, as for instance, when it is expedient to employ separate groups of numeral wheels composed of any desired number of wheels to conform to the number of group columns of the card.

The ribbon feed and shift mechanism described in part of the following, forms the subject-matter of our application Serial No. 70,718, filed March 25, 1936—a division of the present application—and which eventuated in Patent No. 2,041,637, dated May 19, 1936.

Figure 6:
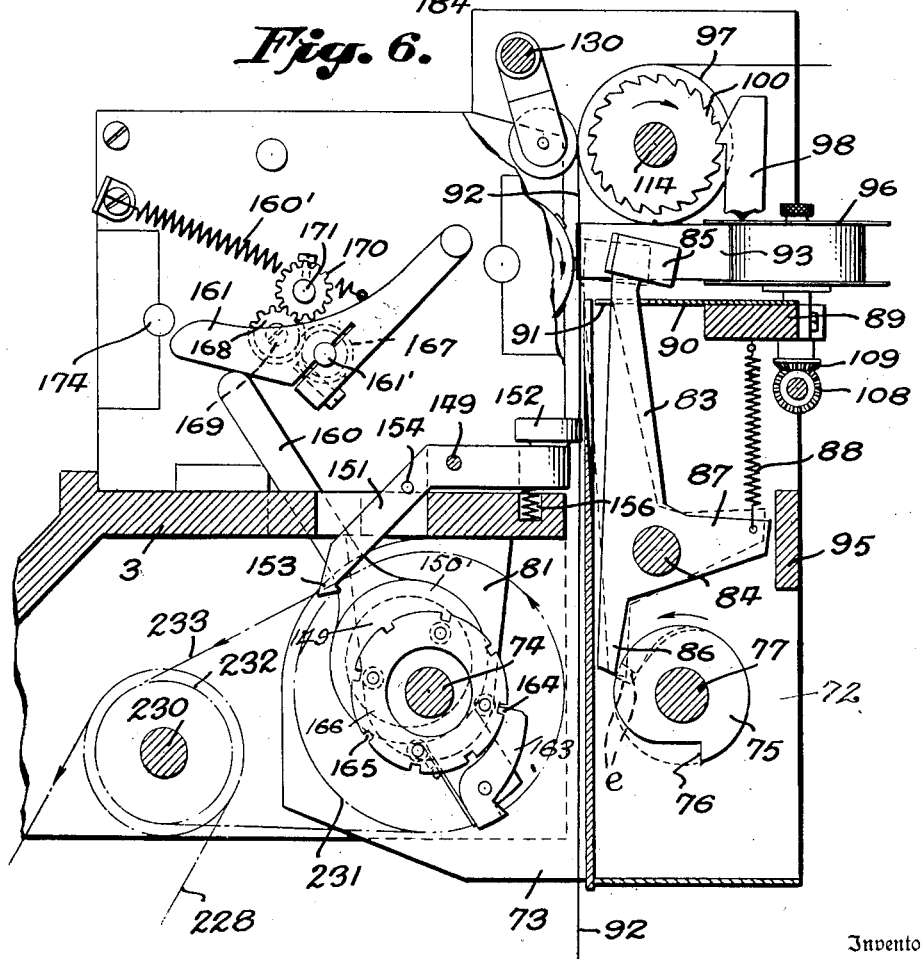
Figure 6 is a view substantially like Figure 5, some of the parts being differently positioned.

The ribbon spools are designated by the numeral 96, Figures 1 and 6, and they and the paper roll 97 are rotated by the vertically movable actuating rod 98 having a shoulder head 99 at its upper end for engagement with the teeth of the paper roll ratchet 100, and a slot 101 in its lower end for the passage of a headed screw 102 by which slot and screw arrangement the rod is guided in its up and down movements and at the same time permitted to swing slightly, as is necessary in its operation. The rod is further formed with a laterally-extending arm 103 having a wide and somewhat elongated slot therein for the reception of the cam 104 mounted on the shaft 77 with the cam 75, the cam 104 serving to give to the rod the desired vertical movement. Pivoted to the rod about midway thereof is a spring-urged pawl 105, the head of which is arranged to engage the ratchet wheel 106 on a shaft 107 extending entirely across the front side of the housing, and carries the beveled gear 108 which meshes with similar gear 109 on short vertical shafts 110 of the ribbon spools, the shaft being suitably supported in bearing brackets on the cross piece 89. The shaft 107 extends across the machine and motivates both spools. The cross piece 89 is slotted for the passage of the rod 98, the slot being of sufficient width to permit of the free slight swinging movement that the rod must have, and which is caused by a flatsided cam 111 on shaft 112 and whose flat side bears against the rear edge of the rod 98, and against which the rod slides in its slight vertical movement. Connected with the shaft 112 is a handle 113 by which the cam may be turned to rock the rod 98 on its fulcrum 102 to move the rod head away from the ratchet 100 which ratchet is mounted on the paper roll shaft 114. The cam 104 imparts vertical movement to the rod 98 and raises it the proper distance to enable the rod head and the head of the pawl 105 to engage the on-coming teeth of the ratchet wheels 100 and 106, and then lowers the rod to turn each of the wheels the space of one tooth, thus turning the ribbon spools and the paper roll accordingly.

Adjacent each ribbon spool there is a pivoted link 115, each carrying a laterally-extending lug 116 to each of which is attached a roller 117. These rollers bear against the ribbon on the spools and the end of each link is connected by an adjustable connection 118 to a connecting arm 118' having a hole 119 centrally located therein for the reception of a pin 119' on the upper plate 120 pivoted at 120' to a central extension 121 of the cross piece 89 of the housing. This plate is provided with an arcuate slot 121' for the passage of a stud 122 to which one end of a spring 122' is connected, the other end of the spring being connected to a link 123 pivoted at 123' to the upper plate. Interposed between the flat face of the extension 121 and the plate 120 is another plate 124, which rocks or pivots on the stud 122. This intermediate plate carries a pin 124' to be engaged by one or the other spur 125 of the upper plate, and the lower plate has similar spurs 125' arranged to engage one or the other of the shoulders 126 of a block 126' on the cross piece. The lower pivoted plate 124 is slotted as indicated at 126' for clearance of the pivot 120', the lower portion of which passes through the roomy slot in the lower plate and into the extension 121. The forward end of the plate 124 is notched in two places as indicated at 127, the notches being for the purpose of receiving, when the plate is in one or the other of its extreme rocked positions, the spring-back ball 128', the ball protruding partly out of a recess in the block 121 for the purpose of stabilizing all of the parts in their extreme positions. There is a pin 119'' on the under side of the bottom plate that extends through elongated slot 120'' at the forward edge of the cross piece and this pin extends into the annular groove of a disk 121'' fast to a sleeve 122'' slidable on the shaft 107. Supported in hangers 123'' are two short sleeves 124'' which surround and are loose on shaft 107, and each sleeve carries at its outer end the beveled gear 108 and on its inner end a toothed clutch member 125" arranged to cooperate with a similar member 126" carried at each end of the slidable sleeve 122", there being in the sleeve and adjacent the grooved disk a slot for the passage of a pin 127" carried by the shaft, thereby assuring the revolution of the sleeve with the shaft and at the same time permitting the necessary lateral movement of the sleeve to allow its clutch members 126" to engage and disengage the corresponding members carried by the short sleeves 124", by which arrangement it will be seen that the shifting of the sleeve 122" to either extreme position will cause one or the other of the clutch members 126" to engage one or the other of the similar members 125" on the inner ends of the short sleeve 124" and thus rotate the engaged sleeve to rotate its gear 108 to turn, through gear 109, its ribbon spool, the bevel gears 108 and 109 being always in mesh.

The way the ribbon shift works is this: The connecting arm 118' is shifted laterally and rocked slightly by the building up of the ribbon alternately on the spools. The rollers on the links bear upon whatever ribbon is on the spools, and as shown in Figure 1, the shift has just been made from the left spool to the right. From now on as the ribbon builds up on the spool 96 its link 115 will be very gradually rocked toward the center of the machine, likewise moving the arm 118' to the left until the side of the opening 119 engages the pin 119' on the upper plate 120, and from that time on and as the ribbon on spool 96' builds up, this top plate will be very slowly turned on its pivot 120' until the pin 119' has passed the center when the spring 122' will instantly act to accelerate the lateral movement of the connecting arm and the pivoted upper plate 120 and cause a spur 125 to strike the pin 124' carried by the lower pivoted plate and rock the plate on its pivot 122 until a spur 125' engages a shoulder 126 of the block 126', the quick shifting of the lower plate causing its pin 119" to swing laterally to shift the sleeve 122" through the medium of the grooved disk 121" to slide the sleeve sufficiently to disengage a clutch member from one of the short sleeves and bring its other clutch member into engagement with the clutch member of the opposite short sleeve. The stud 122 serves a three-fold purpose. It is a pivot for the lower plate 124; an anchor for the spring 122', and is means to limit the throw of the top plate by reason of its slot connection with the stud.

Pivoted in the left and right-hand plates 73 and 73', Figures 1 and 2, is a cross rod 130 whose ends extend through the plates and to each end is secured a latch 131 and 132, which are rigidly secured to the rod. Each latch is provided with a thumb piece 131" and 132', at one end, and a catch 133 at the other, arranged for engagement with and disengagement from similar retaining pins 134. When either or both of the thumb pieces are pressed, two separate movements will occur. First, the rear ends of the latches will be raised out of engagement with the retaining pins to assume the position shown in dotted lines, Figure 5, to permit the entire housing 72 to be swung forward toward the operator, or to the position shown in dotted lines, Figure 10. The rocking movement of the latches rocks the shaft 130 to which is attached near the side plates 73 and 73' the arms 135 and 136 whose lower ends are bifurcated to receive pivoted paper rollers 137 and 138, Figure 1. The paper roller carrier arms are integral with the sleeves 139 which are loose upon the shaft 130, but have very little movement thereon, their movement being limited in either direction by the sides of recesses in the sleeves which engage the lugs 141 carried by collars 142 secured to the shaft by set screws 143, lateral movement of the sleeves being otherwise limited by collars 144 on the shaft. The difference in the size of the lug 141 and the recess 140 permits slight lost motion between these parts so that when the rod 130 is turned until the lug engages the front side of the recess, the catch 133 will be clear of the pin 134, and further movement of the rod will cause the sleeve to turn with the rod, moving the paper rollers away from the paper. For returning these parts to normal position there are provided two plungers 145, one at each side of the machine. These plungers are spring-backed and retained in the bores of barrels 146, which plungers are in engagement with the thumb pieces of the latches, urging them always to cause their catches to embrace a pin 134 to lock the housing 72 to the main body of the machine.

The paper 92 passes in front of the characters on the numeral wheels and has interposed between it and said characters the printing ribbon 93, and the arrangement is such that after a print, the paper continues up over the paper roll 97.

Resetting mechanism

After a printing operation it is necessary to reset all of the numeral wheels to zero preparatory to a new run of cards, and now that the elements contained in the housing have been described, we come to the parts contained in the front of the main body of the machine adjoining the swinging housing, some of which are contained between the plates 73 of the housing.

The numeral 148 designates a lever pivoted at 149 and which is formed with a horizontal arm 150 and an inclined arm 151, there being a thumb piece 152 on one end and a catch 153 at the other, there also being a pin 154 extending laterally from the inclined arm and in position to engage the sides of a recess 155 in the base 3, through which this end of the lever extends, the pin serving to limit the downward movement of this end of the lever, it being urged to its downward position by a spring 156 interposed between the base and the under side of the arm 148. Mounted on the shaft 74 and at one side of the machine, Figures 5, and 6, is an eccentric 149 surrounded by an eccentric strap 150' that has an arm 160 which extends obliquely upward through a recess in the base, where, thereabove, it is arranged to actuate a bell crank lever 161 to control certain cams which in turn control the numeral wheel controlling anchors, of which mechanism more will be explained presently. Integral with the cam strap 150' is an arm 162, to which is pivoted a dog 163 with a tooth 164 on one end and a shoulder 164' at the other, the catch being arranged to engage the shoulder of the lever and the tooth being arranged to enter one or another of the notches 165 in the notched disk 166 loose on the shaft 74 and fast to the sprocket 231 (Fig. 5a), which sprocket is continuously driven the arrangement being such that when the dog 163 is released and its tooth enters a notch in the disk 166, the disk, dog and arm 162 will make one complete revolution with the normally non-rotating shaft 74, which we have seen is geared to the shaft 77, upon which the cam 75 which actuates the printing hammer, is mounted, and when the joint revolution of the shaft, arm and dog is completed, the arm 160 will have rocked the bell crank lever 161 fast upon the shaft 161' to the position shown in Figure 6, against the influence of spring 160', during the first part of the revolution of the eccentric, and returned the arm to its normal position, or that shown in Figure 5, in the final part of its revolution.

The movement from and return to normal position of the bell crank 161 has operated certain cams that control certain movements of the numeral wheel anchors. Referring to Figures 3, 4, 5 and 6, the numeral 167 indicates a gear fast on the shaft 161' with the bell crank. This gear meshes with an intermediate gear 168 on a stub shaft 169, which latter gear in turn meshes with another gear 170 on shaft 171. Both the shafts 161' and 171 extend entirely across the machine and between the plates in which they are mounted take the form of cams, the cam 172 being on or a part of shaft 161', while cam 173 is on or a part of shaft 171. These gears and consequently the cams do not at any time make a complete revolution, their movement being oscillatory and brought about by the rocking movement of the bell crank, whether applied manually or automatically, the automatic character of the operation being that which is given to this part of the machine by the mechanism we have devised, or shaft 74 and mechanism carried thereby, and that for controlling its movements.

Figure 7:
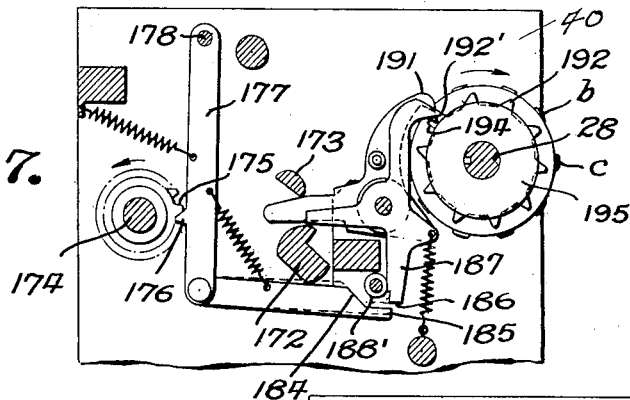
Figure 7 illustrates the numeral wheel mechanism shown in Figures 3 and 4 assembled, and the position of certain cams during the reset operation.

The numeral 174, Figures 3, 4 and 7, designates a shaft suitably mounted in the side plates 40 at the front of the machine, which shaft extends entirely across the machine and carries numerous spiro-longitudinally offset cams 175, one for every numeral wheel. These cams are arranged to engage a cam 176 carried by each of a numerous lot of links 177 swinging in recesses 179 upon a common pivot 178 that passes through the numerous tines 180 of a cross piece 181. To the lower end of this link and pivoted at 182 is a horizontal arm 183 having at its free end an inclined portion 184 that merges into a narrow end 185 adapted at times, as will appear, to ride on the lower end 186 of the downwardly-extending arm 187 of the transfer anchor 31, and at other times engage the notch 188 in said arm to rock the anchor on its pivot, there being a roller 188 adjacent the arm for engagement with the inclined portion 184 to lower said arm at the proper instant in the operation of this mechanism. The link 177 is held against the cams by a spring 189 and a spring 190 always tends to lift the arm 183, and a spring 31" always urges the head 31' of the transfer anchor to normal position toward a portion of the numeral wheel assembly. There is a "transfer" anchor 31, and an "active" anchor 30, and a set of links and arms 177 and 183 for each numeral wheel, all suitably guided and braced against any unwanted movement in their various operations. The active anchor is formed with a head 191 for engagement with one or another of the teeth 192 of the toothed disk 193, and the transfer anchor's head 31' is arranged to be engaged by and released from, at predetermined points and for predetermined times, the lug 194 on the lug disk 195 (dotted lines Figures 4 and 7) of the numeral wheel assembly, which as we have seen, is composed of the numeral disk 29, the tooth disk 193 and the lug disk 195, all compactly held together in laminated form and rotating as one upon the continuously rotating shaft 28 upon which the numerous wheel assemblies are frictionally mounted in such a way that they are compelled to rotate with the shaft except at such times as they are held therefrom by the anchors. Each anchor 30 has thereon a stud 196 in position to be engaged by its companion transfer anchor to disengage the active anchor from the wheel as the exigencies of the operations require.

In Figure 3 the head 24 of the analyzing lever has entered digit 5 in the analyzing roll, through the digit 5 perforation in the card, but it will be expelled therefrom upon the further rotation of the roll by the cam action of the recess and will ride on the card until the digit 1 recess in the analyzing roll has passed. The rear end 33 of push rod 32 is held normally against cross piece 33' of slotted arm 33" by a spring 34', which arm is rocked at timely intervals. This arm carries in the slot therein a slidable plate 34" for engagement at appropriate intervals with the analyzing lever 22 to hold its head 24 out of engagement with the power roll 4, against the tension of spring 26. The position of the power roll 4 is such with relation to the head 24 of the analyzing lever 22 that when the head is cammed out of the recess (which represents digit 5 in Figure 3) the push rod will be kicked forward against the action of spring 35 causing rocker arm 38 to depress arm 44 of tooth wheel anchor 30, rocking it on its shaft 44' and disengaging its head 191 from a tooth on the numeral wheel, and in the position illustrated, allow the wheel to revolve a distance of five teeth, which action has been caused by the head 24 passing through perforation "5" in the card and its instantaneous expulsion therefrom. At about a point between "0" and "1" designations on a card, arm 33" will, by properly timed mechanism, be lowered depressing push rod 32 and taking its rear end 33 out of the way of the analyzing lever. At this moment spring 35 will urge the push rod rearwardly, allowing the rocker arm 38 to release the anchor 30 and under the influence of spring 45 permit it to engage the sixth or on-coming tooth to arrest the movement of the wheel, after five teeth have passed, counting five on said wheel. At this time the slidable plate 34" will be forced forward, resetting the analyzing lever and holding its head 24 out of and away from the roll 4 until the forward longitudinal edge of the next card is a short distance under the roll, when plate 34" will be withdrawn, allowing the head 24 to rest and ride on the card until a perforation is reached, when the above cycle will be repeated.

The distance between the digits "9" and "1" represented by the recesses 6, in the roll is equivalent to the distance between digits "9" and "1" on the card. The distance of movement of the smooth portion of the roll is equivalent to the distance between "0" designation on the card just tabulated and the forward edge of the card to be tabulated. The head 24 is held out of and away from the roll during the passage of its smooth portion past the head.

When the numeral wheel has counted up to its capacity or "nine" the lug 194 on the lug disk will trip the transfer anchor 31, forcing its head 31' backward only a sufficient distance to permit the narrow portion 185 of the arm 183 to drop in the notch 188 of the depending arm 187 of the transfer anchor. After this action has taken place and the notch is occupied by the end of the arm 183, both the link and arm 177 and 183 will be pushed forward by the cam 175 acting on the cam 176 on the link, thus forcing the upper end of the transfer anchor 31 backward to engage the stud 196 on the next anchor 30 to the right, which allows a wheel to revolve until the head 191 catches the next on-coming tooth, which, when the first and second wheels from the left are considered, the first has added up to its capacity or "nine", "one" will be transferred to the second wheel to make a total of "ten." Until the depending arm 187 of the transfer anchor has been rocked forward the narrow portion of the arm 183 will merely ride back and forth under the lower end of the anchor arm without any definite action taking place, but when the notch is occupied by the narrow portion of the arm it assumes the position shown in dotted lines. Figure 4, and will move the anchor to its new position or that shown in dotted lines, but continued forward movement of the arm brings the inclined portion 184 against the roller 188 thus depressing the arm and causing its end to again ride aimlessly against the end of the anchor, thus allowing both of the anchors to return to normal positions under the influence of their respective springs. This is timed with the action of the cam on shaft 174, so that the anchor 30 will permit only one tooth to pass under it before it returns to normal position, and at this time the arm 183 and the anchors are in position to start a new cycle, or in the positions shown in Figures 3 and 4.

Referring to Figures 4, 5, 6 and 7, when the arm 160 is raised it rocks the bell crank lever 161 against the influence of a spring 160' and rocks gear wheel 167, thus turning cam 172 and also the idler gear 168, which idler in turn, turns the gear 170, which turns or rocks the cam 173, the movement of gears 167 and 170 and consequently the cams 172 and 173 being in the forward direction. The cam 173 bearing on the arm 44 of the anchor 30 releases its head 191 from the tooth 192' (Figure 7) and when released the numeral wheel assembly is permitted to revolve with the shaft 28. As long as the head of the anchor is free from the teeth of the assembly, the assembly would continue to revolve with the shaft, but due to the fact that the head 31' of the transfer anchor is in the path of movement of the lug 194 on the lug disk, and the head being held forward by the cam 172, taking the position shown in Figure 7, locks the anchor, and as the numeral wheel shaft and wheels continue to rotate in their normal direction (forward) the lug contacts with the transfer anchor head and stops the assembly.

Obviously, due to the accumulating process, different numerals will be in line in printing position, and momentarily held there for the print which is accomplished quickly at the beginning of the reset movements, and although the printing and reset movements of the parts are set in motion simultaneously by the same means (the pressing of the lever 148) their operating cams are so arranged and formed as to give time for the printing operation to have been accomplished, with time to spare for the orderly completion of the resetting of all the numeral wheels.

At the time the print is made and due again to the accumulating process, the lug 194 on the lug disk of the different numeral wheel assemblies will be at different points in their paths of rotation, but as a lug and transfer anchor head engage, that particular wheel assembly will be stopped until finally all have been stopped at the same relative position. The parts are arranged and timed so that when the lugs are held by the transfer anchors the zeroes of the wheels will be in line at the point $b$ (Figure 7), but when the bell crank 161 starts its reverse stroke the cam 173 releases the anchor 30 allowing its head to take its normal position behind the tooth 192' and the cam 172 allows the rearwardly extending arm of the transfer anchor to be moved downwardly when the lower end of the transfer anchor is engaged by the arm 183, to release head 31' from the lug and allow the digit $b$ to be brought to the position $c$.

The shafts 74 and 77 are geared together, as shown in Figure 10, and when the thumb piece 152 is pressed to bring about a revolution of the shaft 74 and the parts carried thereby, the shaft 77 and cam 75 thereon will also be rotated. The two dotted lines $e$, Figure 6, of the drop 76 indicate the position of the cam and the extension 86 of the hammer before the thumb piece has been pressed and immediately thereafter, the space between them showing the short distance the cam travels in order to take a print. However, as before stated, the spring 88 is strong and the movement of the cam fast, and as these two shafts 74, 77 rotate with their operative parts, the drop in the cam will be brought in position to let in the arm 86 of the hammer and permit the spring to snap the hammer forward to make a print, a further movement of the cam withdrawing the hammer and the further movements of the parts controlled from the shaft 74, immediately completes the reset operation through the operation of the bell crank 161 and the parts controlled thereby to permit all of the wheels to be brought to zero preparatory to a new card run.

*Motor starting mechanism*

The parts, Figure 12, are shown in no-card position and they will remain in this position whether the machine is running or not so long as no cards are passing through, but we have associated with these parts a novel motor starting mechanism put in operation by the depression of the lever 67'. The pressing of this lever lowers the arm 66' to lower the card-holding plate 80" (Figure 1) to bring the stack of cards thereon down to position to be engaged by the feed knives.

The lever 67' carries on its inner side a roller 197 for engagement with the beveled portion 198 of a starting lever 199 pivoted at 200 to the side plate 2. The lower end of this lever enters the pin guarded recess 201 of the head 202 on rod 203 that slides in a bore 204 in a block 205 secured to the under side of the base of the machine, there being in the block a slot 206 for the passage of a pin 207 carried by the rod. This pin is arranged for engagment with an elongated fin or lug 208 carried by a collar 209 secured to the shaft 74 when the rod has been moved forward by the rocking of the lever 199 to bring the pin 207 to the position shown in dotted lines, Figure 15. The rod 203 has a depression 208 therein, in which is a ball 209', upon which rests another ball 210, the latter protruding slightly above the rim of a recess 211 in which the balls are contained, the upper ball being in contact with a spring element 212 fastened to the block and whose free end carries a button 213 of non-conducting material. When the rod 203 is moved forward, the lower ball will be squeezed out of its depression in the rod and force the upper ball against the element 212 and cause it to close the circuit between the two terminals 214 and 215 fastened to the block 216 of insulating material, allowing the current to flow through the wires 217, 218 and operate the motor 219, there being interposed between the motor and the current source a fuse 220 and a manually-operated switch 221.

The downward movement of the lever 67' causes the lever 199 to move the rod forwardly to dotted-line position to bring the pin 207 to position to be engaged by the lug 208 on the collar 209 on shaft 74, which shaft revolves only when the reset mechanism is operated and then makes but one revolution during which the pin will be engaged by the lug to force the rod to its circuit-breaking position which is that shown in full lines.

So that the operator may be relieved of the necessity of lifting the entire weight of the swinging front part of the machine, there is provided (Figure 2) a retarding means which includes a rod 241 slidable in hangers 242 and 243 fastened to the under side of the base. To the forward end of the rod is attached a chain 234 that is made fast to a sprocket 235 which surrounds shafts 74 but is entirely independent of the shaft, the sprocket being secured to the side plate of the housing by screws or other means and the only movement it has is that given it by the swinging movement of the housing. Interposed between the hanger 242 and an adjustable collar 236 on the rod is a spring 237 whose compression and expansion in opening and closing the housing, assisted by the chain and sprocket, eases the movement of the housing in both directions, there being an additional adjustable collar 238 on the rod to limit the forward movement of the rod and consequently the housing.

Power is supplied, any suitable kind of power but preferably that from an electric motor 219, whose shaft 223 has thereon two sprocket wheels 224 and 224', and from one sprocket runs a chain 225 that runs over the sprocket 226 on a shaft 227 having bearings in the side plates 1 and 2. From the other sprocket of the motor runs a chain 228 that runs over the sprocket 229 on the shaft 230 shown in Figures 2 and 6, and as shown in Figure 6, this shaft is geared with the shaft 74 by means of a large continuously rotating sprocket 231 on shaft 74 and a sprocket 232 on the shaft 230 by a chain 233.

It is not deemed necessary to say much more than that the power for the whole machine is supplied directly from the motor to the two sprockets 227 and 230 and from thence to other parts of the machine by means of sprockets, chains and inter-meshing active and idler gears, all suitably formed, positioned and timed for coordinative action in the various functions they are called upon to perform, for instance from shaft 230, through chain 231' (Figure 10) and from shaft 174 through suitable intermeshing gears to the shaft 28 upon which the numeral wheel assemblies are frictionally mounted, and that the shaft 77, in the swinging front of the machine, gets its power through connections with shaft 74, etc.

The main bearings for the shaft 28 of the numeral wheels or numeral wheel assemblies are in the side plates 40 and 41, but since the shaft is long and carries numerous wheels, we have provided an open end bearing in the standard 28', Figure 4. The standard is provided with a base extension 239 which rests on a cross piece 240 extending between the plates 40 and 41. This base has a hole through it for the passage of a screw 241 and the cross piece is provided with numerous threaded sockets, arranged in a row for the screws; thus this bearing becomes adjustable longitudinally of the cross piece 240, so that the numeral wheel shaft may be given additional support at any desired point between its main end bearings. This bearing is about the width of three numeral wheel assemblies and in mounting the various wheels, room is left on the shaft for the bearing, and this space on the shaft also permits of the wheel being slid or shifted longitudinally at any point on the shaft to facilitate special wheel groupings, and at the same time giving the shaft a bearing at the point most needed in any particular push rod arrangement.

We claim

1. In a tabulating machine, a counter resetting means, a rockable arm for controlling the resetting movements of said means, a normally non-rotating power shaft, an eccentric fast to said shaft, an eccentric strap surrounding said eccentric and formed with an arm reciprocated by the eccentric for operating the rockable arm, a continuously rotating clutch member, a dog carried by the eccentric and arranged for engagement with the clutch member, a pivoted lever normally holding said dog out of engagement with the clutch member and having a portion normally in the path of movement of the dog to engage said dog to declutch the clutch member when the shaft has made a complete revolution.

2. In a tabulating machine, a counter-resetting means, a rockable arm for controlling the resetting movements of said means, a normally non-rotating power shaft, an eccentric fast to said shaft, an eccentric strap surrounding said eccentric and formed with an arm reciprocated by the eccentric for operating the rockable arm, a continuously rotating clutch member comprising a disk having spaced notches in the periphery thereof, and loosely mounted on the power shaft, a dog carried by the eccentric and having a tooth arranged to enter one or another of the notches in said disk to lock said disk to the eccentric to cause a revolution of the power shaft, a pivoted lever normally holding said dog out of engagement with the clutch member and having a portion normally in the path of movement of the dog to engage said dog to de-clutch the clutch member when the shaft has made a complete revolution.

ROBERT DUNCAN.
LESTER F. WILKINSON.